United States Patent
Stasz

[19]

[11] Patent Number: 5,822,200
[45] Date of Patent: Oct. 13, 1998

[54] LOW LEVEL, HIGH EFFICIENCY DC/DC CONVERTER

[75] Inventor: Peter Stasz, Mounds View, Minn.

[73] Assignee: NT International, Inc., Minneapolis, Minn.

[21] Appl. No.: 844,603

[22] Filed: Apr. 21, 1997

[51] Int. Cl.⁶ .................................................. H02M 3/335
[52] U.S. Cl. .............................................. 363/21; 323/906
[58] Field of Search ....................... 363/21, 98; 323/906

[56] References Cited

U.S. PATENT DOCUMENTS

| | | |
|---|---|---|
| H844 | 11/1990 | Otto et al. . |
| 4,483,319 | 11/1984 | Dinh . |
| 4,546,421 | 10/1985 | Bello et al. . |
| 4,626,983 | 12/1986 | Harada et al. . |
| 4,675,797 | 6/1987 | Vinciarelli . |
| 4,692,683 | 9/1987 | Lalmond . |
| 4,804,858 | 2/1989 | Jorlov ..................................... 323/906 |
| 4,837,452 | 6/1989 | Peterson . |
| 4,922,396 | 5/1990 | Niggemeyer .............................. 363/21 |
| 4,977,329 | 12/1990 | Eckhardt et al. . |
| 4,998,294 | 3/1991 | Banks et al. . |
| 5,063,489 | 11/1991 | Inaba . |
| 5,298,800 | 3/1994 | Dunlop et al. . |
| 5,349,523 | 9/1994 | Inou et al. . |
| 5,498,995 | 3/1996 | Szepesi et al. ............................. 363/21 |
| 5,528,409 | 6/1996 | Cucci et al. . |
| 5,608,613 | 3/1997 | Jansen ..................................... 363/21 |
| 5,629,841 | 5/1997 | Attwood .................................. 363/21 |

*Primary Examiner*—Stuart N. Hecker
*Attorney, Agent, or Firm*—Haugen and Nikolai, P.A.

[57] ABSTRACT

A DC-to-DC converter suitable for use in light-powered electronic systems. The DC electrical output from a solar cell is stepped-up in a chopper-type inverter that is driven by a gated oscillator. The output from the inverter is then rectified and is adapted to be applied to a load through a series connected switch whose on/off state is determined by the output from a voltage regulator. Connected between the rectifier and the series switch are energy storage capacitors which become charged when the series switch is open and which provide energy to the load when the series switch is closed. Feedback from the regulator circuitry controls the on/off state of the gated oscillator and, therefore, the energy delivered by the inverter. Further circuitry is provided for signaling a light transmitting device that the fiber-optic link delivering energy to the photo cell is intact.

9 Claims, 3 Drawing Sheets

LOW LEVEL, HIGH EFFICIENCY DC/DC CONVERTER

BACKGROUND OF THE INVENTION

I. Field of the Invention

This invention relates generally to the design of a DC-to-DC converter, and more particularly to such a converter that is compatible with light-powered electrical loads.

II. Discussion of the Prior Art

DC-to-DC converters, per se, are well known in the electronic arts and are commonly used to convert a DC input voltage at one level to a DC output voltage of a different level. Where the input level exceeds the output level, the converter is referred to as a "buck" converter and when the output level exceeds the input level, it is referred to as a "boost" converter. In implementing such devices, it is common practice to chop the input DC voltage and apply the resulting chopped signal to a transformer of either a step-up or a step-down variety, depending upon whether a boost or a buck converter is desired, and then rectifying and filtering the transformer output to obtain a desired DC output.

In the Cucci et al. U.S. Pat. No. 5,528,409 there is described a fiber-optic interface system for interfacing a remote process variable sensor/transmitter to a local control system in which optical power delivered from the local site is used to power the transmitter and electronics at the remote site. It includes a photo-diode power converter 50 designed to convert light energy from a laser arriving over a fiber-optic bundle 20 to a DC voltage capable of powering the electronics of the remote interface module 18 and ultimately a load device 14. When it is considered that to meet eye safety and intrinsic safety protocols, the power being transmitted through the fiber-optic link must not exceed about 35 mW, a typical solar cell used in the optical-to-electrical conversion can only deliver a voltage of from about 0.8 to 1.2 volts DC. This is due to losses in the fiber, which are distance dependent, and the low (50%) conversion efficiency of such solar cells. Moreover, a solar cell is incapable of satisfying high in-rush current requirements imposed on known prior art DC-to-DC converter circuits presently on the market when energizing various loads.

From the foregoing, it can be appreciated that a need exists for a low level, high efficiency, DC-to-DC converter capable of converting the DC output from a solar cell to a voltage level sufficient to power a load that exhibits high in-rush current characteristics. The present invention provides such a device. The DC-to-DC converter to be described exhibits an efficiency of about 75% with a start-up current that is less than 10 mA at one volt. The converter of the present invention is capable of delivering power to a load in which in-rush currents of about 40 mA persists for about 5 ms before dropping down to about 1.2 mA.

As is explained in the aforereferenced Cucci et al. patent, it is desirable that a fiber-optic interface system in which the present invention finds use also provide a signal back to the laser source to indicate that the remote module is receiving light energy over the fiber-optic link. For this reason, the DC-to-DC converter of the present invention incorporates circuitry for returning a light signal to the laser source so long as the solar cell device connected to the input of the converter is receiving light energy. Should the transmitting laser fail or should the fiber-optic link become broken or disconnected, the light signal from the converter will no longer be received by the transmitting unit which then causes the laser in the transmitting unit to shut down.

SUMMARY OF THE INVENTION

The present invention comprises a low level, high-efficiency DC-to-DC boost converter circuit having a pair of input terminals adapted to be coupled to a solar cell that is energized by light energy from a laser transmitter via a fiber-optic bundle. An inductance device, either a transformer primary or a simple inductor, and a semi-conductor switch are connected in series with the source and a gated or pulse width controlled oscillator is connected to drive the semi-conductor switch for turning it on and off at a predetermined frequency to thereby induce an AC voltage across the inductance device. A rectifier is connected to the inductance device for converting the AC voltage back to a DC voltage that is greater than the DC voltage of the source. An electronic switching means is connected in series between the rectifier and a pair of load terminals. Energy storage means are coupled in circuit with the electronic switching means and the rectifier for initially storing a voltage therein when the electronic switching means is in a non-conducting state and for dumping the stored voltage into the load when the electronic switching means is conducting. The transfer of energy from the energy storage means to the load ultimately satisfies the high in-rush current demands of the load, although it may be necessary to recharge and discharge the energy storage means repetitively before a voltage regulator circuit in the converter is capable of sustaining the desired DC load voltage. High efficiency is achieved by proper selection for low loss components, which include the rectifier diode, the switching transistor and the CMOS IC's wherever possible.

DESCRIPTION OF THE DRAWINGS

The foregoing features and advantages of the present invention will become apparent to those skilled in the art from the following detailed description of a preferred embodiment, especially when considered in conjunction with the accompanying drawings in which.

DESCRIPTION OF THE PREFERRED EMBODIMENT

Figure 3:
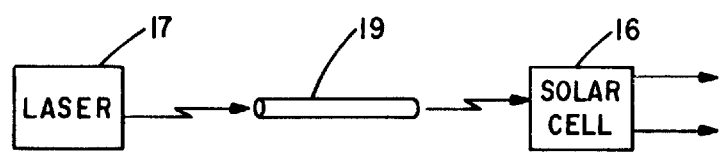
FIG. 3 is a detailed view of the D.C. source 16 of FIG. 1.

Referring to the drawing, enclosed within a dashed line box 10 is a schematic electrical diagram of the low level, high efficiency DC-to-DC converter comprising a preferred embodiment of the present invention. It is seen to include first and second input terminals 12 and 14 which are adapted to be connected to a source of DC voltage shown as a battery in FIG. 1, but preferably a GaAs photocell 16 as shown in FIG. 3. The solar cell 16 (FIG. 3) will typically be irradiated by laser energy from a source 17 transmitted through a fiber-optic cable 19 and typically will produce about a 1 volt output. A conductor 18 connects the input terminal 12 to one side of the primary winding 20 of a step-up transformer $T_1$. The transformer may typically have a turns ratio of about 3 to 1. Connected across the input terminals 12 and 14 are shunt capacitors 22 and 24 which act as low pass filter and also provide energy storage.

Connected in series with the primary winding 20 of the step-up transformer $T_1$ is a semiconductor switch, here shown as a NPN transistor 26. The emitter of transistor 26 is connected to ground while its collector electrode is connected to a second terminal of the primary winding 20.

The base electrode of the semiconductor switch 26 is connected to the output of a NOR gate 28 by a coupling resistor 30. The NOR gate 28 is adapted to be driven by a gated or pulse width controlled oscillator, indicated generally by numeral 32. The pulse width controlled oscillator comprises a first NOR gate 34 having a pair of input terminals 36 and 38 and an output terminal 40. NOR gate 34 provides its output to an input of a further NOR gate 42, the other input of which is tied to ground. The output from NOR gate 42 is applied as an input to the NOR gate 28 and to a further NOR gate 44. The output from NOR gate 44 is fed back through series connected resistors 46 and 48 to the input terminal 38 of NOR gate 34. A timing capacitor 50 is connected between the output terminal of NOR gate 42 and the common junction 52 between the series resistors 46 and 48. The gated oscillator 32 and transistor switch 26 function to chop the DC current flowing through the transformer primary 20.

The secondary winding 54 of transformer $T_1$ has a first terminal thereof connected to the terminal of the primary winding 20 that is also connected to the collector electrode of transistor 26. The remaining terminal of secondary winding 54 is coupled through a diode 56 to the circuit's output bus 58. Diode 56 functions as a half-wave rectifier. Also connected to the bus 58 is a voltage regulator shown enclosed by broken line box 60. It includes a voltage regulator chip 62 having a first output thereof connected by a conductor 64 and a voltage divider resistor 66 to the input terminal 36 of NOR gate 34. Resistor 37 is connected between terminal 36 and ground. The output signal on line 64 is used to gate the astable oscillator 32 on and off which, as will be explained, controls the output voltage level of the DC-to-DC converter of the present invention. The voltage regulator chip 62 may comprise a MAX 921 integrated circuit dual comparator device, but limitation thereto is not to be inferred. The voltage present on the output bus 58 is sampled through a voltage divider, including series connected resistors 68, 70 and 72. The V+ bias for the voltage regulator circuit 62 is applied by a conductor 74 tied to the output bus 58. Resistors 160 and 162 provide hysteresis for the regulator as measured on the output bus 58.

Zener diodes 76 and 78 are connected between ground and the output bus 58, as are storage capacitors 80, 82 and 84. The Zener diodes function to limit the voltage on bus 58 to 5.2 volts which is in compliance with Underwriters Laboratories Standard UL 913 for intrinsic safety for electrical apparatus used in hazardous locations.

A power output switch 86 comprises an electronic switching means and may be a MOSFET that is connected in series with the output bus 58 and a load terminal 88. The on/off state of the MOSFET power control switch 86 is, in turn, controlled by semiconductor switches 90 and 92 which are configured to function as a AND gate. A transient voltage suppressor 94 is connected across the load terminals of the circuit to provide electrostatic discharge protection.

Controlling the switching of the power output switch 86 is an output controller shown enclosed by broken line box 96. It is seen to include a further MAX 921 comparator chip 107 configured to provide hysteresis to the turn on and turn off of device 90. It has a threshold input 98 applied, via a voltage divider that includes resistors 100, 102 and 104 connected between the bus 58 and ground. The semiconductor device 90 has its gate electrode connected to an output 106 of the output controller 96. The resistors 108 and 110 provide a desired hysteresis characteristic, as will be further explained later on herein. The gate electrode of FET 86 is connected to the bus 58 via resistor 156.

The gate electrode of FET 92 is connected to a common junction 112 between a resistor 114 whose other terminal is connected to the bus 58 and a capacitor 116 whose other terminal is connected to ground. Diode 158 has its cathode connected to the bus 58 and its anode to the common junction 112.

To provide eye safety, the circuit 10 further includes a comparator 118, preferably comprising a MAX 922 that receives an input signal, via conductor 120 from the voltage regulator 62 by way of voltage divider resistors 122 and 124. A second input to the comparator 118 is the signal from the input terminal 12 (via conductor 126).

The output from comparator 118 on conductor 128 is applied through diode 130 as an enable input to terminal 132 of an astable oscillator circuit 134. Bias voltage for the astable oscillator 134 comprises the DC voltage present on output bus 58. The output of the oscillator 134 is coupled through a resistor 136 to an output terminal 138. The remaining output terminal 140 is connected to ground and adapted to be connected across the output terminals 138 and 140 is an LED 142. The requisite positive feedback for the astable oscillator 134 is provided via conductor 144 connected to the oscillator's output and the series connected resistor 146 and diode 148 to the input terminal 150 of the astable oscillator circuit 134. The repetition rate of the oscillator is mostly determined by the RC circuit including resistor 152 and capacitor 154. Resistor 146, diode 148 and capacitor 154 determine the pulse width. Resistor 155 is connected between conductor 120 and the positive input to the comparator 134. Likewise, resistor 153 is connected between input terminal 132 and conductor 144.

Figure 1:
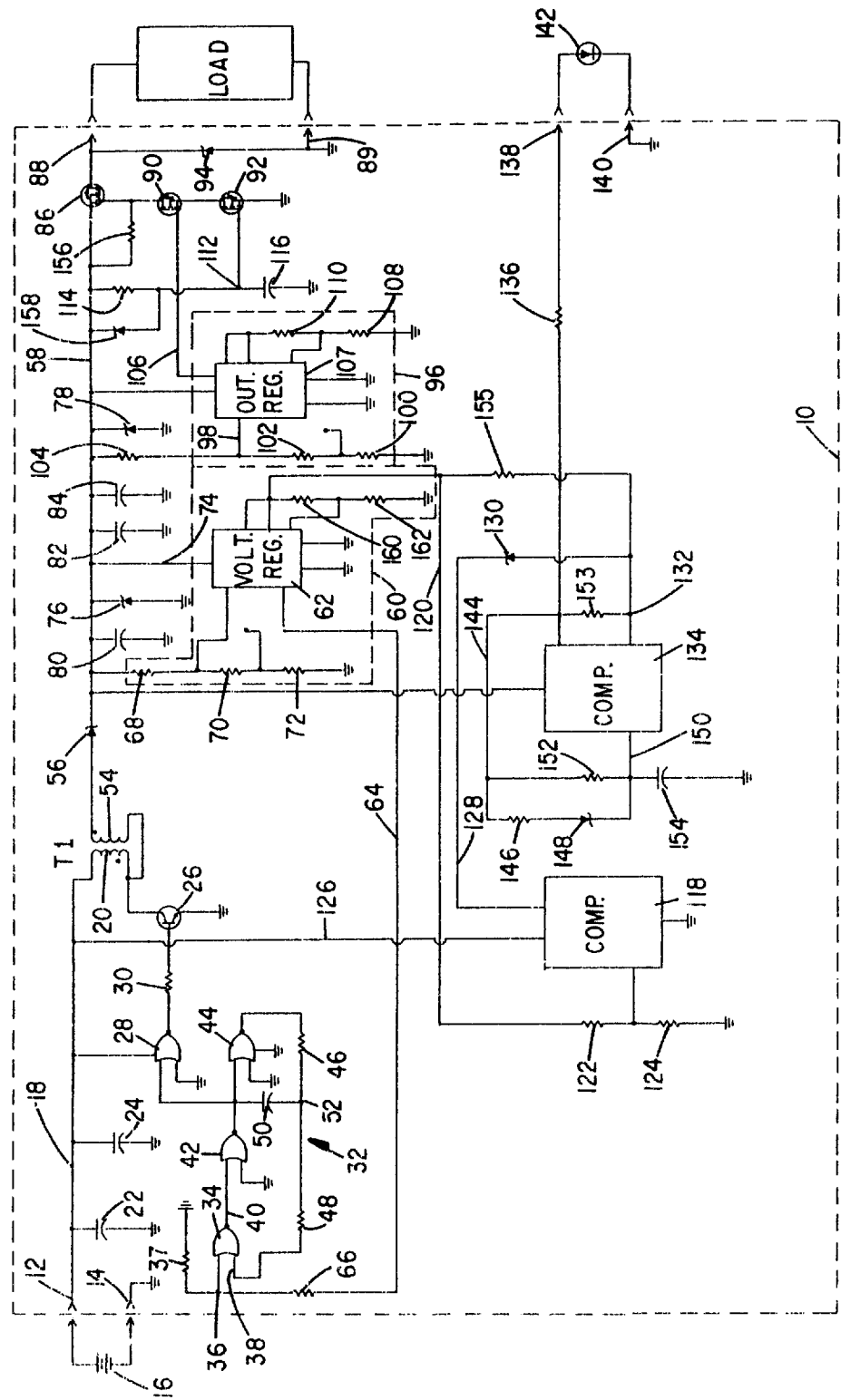
FIG. 1 illustrates a schematic electrical diagram of the present invention.
Figure 2:
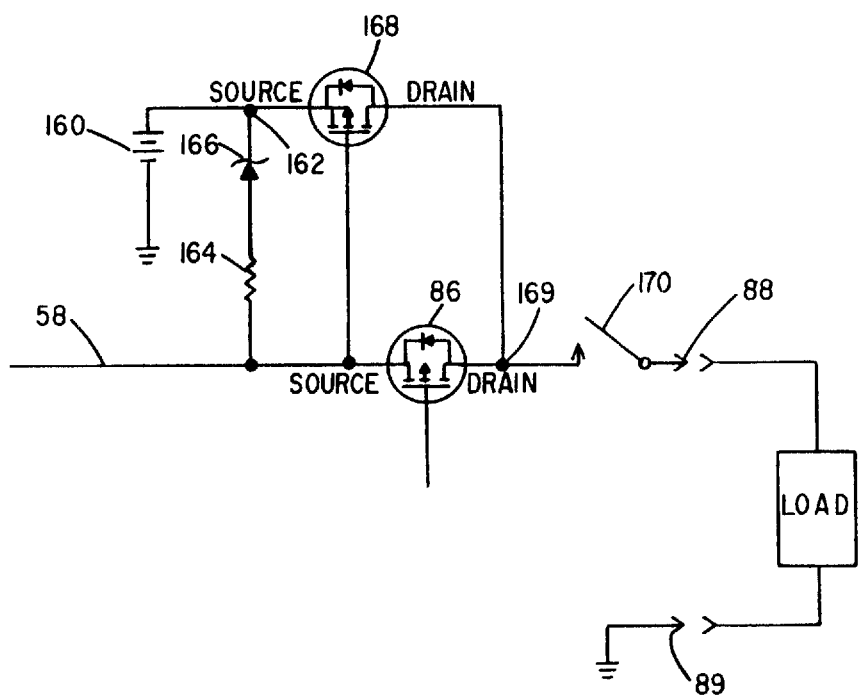
FIG. 2 shows a circuit for providing battery back-up to the circuit of FIG. 1.

FIG. 2 illustrates additional circuitry that may be added to the DC-to-DC converter of FIG. 1 to provide battery back-up for supplying current to the load in the event of a failure of the laser or the fiber-optic cable that is to provide light input to the solar cell 16. The output terminals 88 and 89 to which the load is connected as well as the series power switch 86 are shown in FIG. 2 for reference purposes.

Also shown in FIG. 2 is a back-up battery 160 having its negative electrode connected to ground and its positive electrode connected to a junction point 162. Connected between that junction point 162 and the bus 58 is a series combination of a resistor 164 and a diode 166. A further "p" FET switch 168 has its source electrode also connected to the junction 166 and its drain electrode is connected to the drain electrode of the FET switch 86. The gate electrode of FET switch 168 is also connected to the bus 58 and to the source electrode of FET switch 86.

A single pole single throw manual switch 170 is connected in series between load output terminal 88 and the junction point 169 where the drain electrodes of the FET switches 86 and 168 are connected together.

OPERATION

Having described in detail the circuit components and their mode of interconnection in implementing the low level, high efficiency DC/DC boost converter of the present invention, consideration will next be given to its mode of operation. In light-powered control systems where it is desired that laser energy be fed over fiber-optic cables to a load device requiring a substantially higher voltage than can be obtained directly from a solar cell, a need exists for a DC-to-DC converter capable of stepping up the voltage to a value compatible with the load. A typical solar cell, such as a gallium arsenide solar cell 16 will typically produce only one volt output, especially when it is recognized that in many applications it is necessary to abide by industrial standards relating to eye safety and intrinsic safety. Those standards dictate that the power in the light fiber leading to the solar cell 16 not exceed about 35 milliwatts. Given this restriction, the DC-to-DC converter employed must exhibit high efficiency so that sufficient power will be available for the load. In those instances where the load places a high initial drain at start-up, means must be provided for temporarily storing up energy until the load voltage reaches a level where it can be sustained, taking into account the current in-rush characteristics of the load.

The NPN transistor switch 26 in series with the primary winding 20 of the step-up transformer $T_1$ comprises a chopper-type power supply in which the DC input from the source 16 is effectively changed to an alternating current. The way in which the DC signal is chopped is determined by the gated oscillator 32 which is designed to provide bursts of pulses at, for example, 75 KHz when gated to its "on" state. The resulting AC signal induced in the secondary winding 54 of the transformer is then half-wave rectified by diode 56 and filtered by capacitor 80, 82 and 84, with the resulting stepped-up DC voltage appearing on the bus 58. The regulator circuit 60 is designed to limit the output voltage level to a predetermined value, such as 3.7 volts. However, when a load exhibits high in-rush current requirements, the drain is such that this regulation level cannot be immediately reached following application of light energy to solar cell 16. To obviate this problem, I provide energy storage capacitors 80, 82 and 84 which are allowed to charge up with the load disconnected by the switch 86 when it is non-conducting. During the power-up phase, to prevent controller circuit 96 from sporadically turning switch 86 on and off, the FETs 90 and 92 function as an AND gate for the switch 86. Resistor 114 and capacitor 116 provide a time delay during which capacitors 80, 82 and 84 charge up. When the delay elapses, FETs 92 and 90 turn on, which in turn causes series power switch 86 to turn on. When switch 86 becomes forward biased and the energy from capacitors 80, 82 and 84 is provided to the load, it brings the regulator output into its operational range. In that the initial dump of energy from the capacitors to the load may not be sufficient to bring the load into its operational range, successive charging/discharging cycles are provided for by the hysteresis characteristic of the controller circuit 96. The hysteresis voltage difference is determined by the resistive components 108 and 110. Ultimately, when the output voltage on bus 58 reaches its preestablished desired value, regulator circuit 60 is able to take over to maintain the output voltage above the higher hysteresis setpoint.

The regulation of the output voltage is achieved partially through the feedback signal on line 64 emanating from the regulator circuit 60 which controls the on/off state of the gated or pulse width controlled oscillator 32 and, thus, the way in which the DC input signal is chopped and energy is delivered across the inductance device $T_1$.

To guarantee that the laser at the transmitting site or the data fiber coupling that laser's output to the solar cell 16 is intact, the circuit of the present invention provides a light signal back to the laser transmitter (not shown) and which, if absent, results in a shut down of the laser transmitter. In implementing this feature, the comparator 118 looks for a DC voltage on the line 18 indicative that the solar cell 16 is being energized and generating its approximately 1 volt output. If this voltage is above about 0.7 volts, which is a threshold established by the output of the voltage divider comprising resistor 122 and 124, the comparator 118 provides an output to enable the astable circuit 134 which is configured to then oscillate at a frequency of about 50 Hz. This signal is coupled through resistor 136 to the output terminals 138–140 and used to drive a LED or low power laser 142 whose optical output is fed back, via a fiber-optic link (not shown), to the remotely located laser transmitter. Should the laser or the fiber-optic bundle linking the laser to the solar cell 16 fail or become disconnected, the LED or low power laser 142 will cease flashing. This causes the laser transmitter to be immediately switched off, for example, within about 0.2 seconds, and, thus, providing eye safety to anyone working to restore the system to its operating mode.

In the event that either the laser at the transmitting site or the data fiber coupling the laser's output to the solar cell should fail, the circuitry shown in FIG. 2 will, at least temporarily, supply power to the load. The switch 170 is provided so that load current can be interrupted to prevent draining of the back-up battery 160 when the system is on-the-shelf or in shipment. When the device is installed and in use, the switch 170 will be closed.

When laser power is present at the solar cell 16, the FET switch 86 will be closed and FET switch 168 will be open. When in this state, a current path is provided via resistor 164 and diode 166 to the battery 160 to provide trickle charging thereof. However, should the solar cell 16 or the fiber-optic leading to it fail, FET 86 will be rendered non-conductive whereas FET switch 168 will be turned on. Current will then flow from the back-up battery 160, through the conducting FET switch 168 and the mechanical switch 170 to provide continued power to the load.

While the chopper power supply employed in the present invention is shown as including a transformer $T_1$, those skilled in the art will appreciate that an inductor may be used as well. The inductor will have a first terminal connected to line 18 and a second terminal connected to a junction point between the collector of transistor 26 and the anode of diode 56. Clearly, the foregoing description is set forth for purposes of illustrating the invention, but is not deemed to limit the invention in any manner. Additional modifications may be made to the disclosed embodiment without departing from the scope thereof, as set forth in the appended claims.

What is claimed is:

1. A low-level, high-efficiency, DC-to-DC converter circuit comprising:
    (a) a source of DC voltage including a solar cell adapted to receive light energy from a laser source by way of an optical fiber;
    (b) an inductance device and a semiconductor switch connected in series with said source;
    (c) a gated or pulse width controlled oscillator connected to the semiconductor switch for turning the semiconductor switch on and off at a predetermined frequency when the gated oscillator is gated on, inducing an AC voltage across the inductance device;
    (d) rectifier means connected to the inductance device for converting the AC voltage back to a DC voltage greater than the DC voltage of said source;
    (e) a pair of output terminals to which a load is to be connected;
    (f) electronic switching means connected in series between the rectifier means and the pair of output terminals; and
    (g) energy storage means coupled in circuit with the electronic switching means for initially storing a voltage therein when the electronic switching means is in a non-conducting state and for providing said stored voltage to the load when the electronic switching means is conducting.

2. The low level, high efficiency DC-to-DC converter of claim 1 wherein the inductance device comprises a step-up transformer.

3. The low level, high efficiency DC-to-DC converter as in claim 1 wherein the electronic switching means includes means for sensing a voltage across the energy storage means and for again placing the electronic switching means in its non-conducting state when the voltage across the energy storage means falls to a predetermined level.

4. The low level, high efficiency DC-to-DC converter of claim 1 and further including voltage regulator means connected to receive an input voltage proportional to the DC voltage from the rectifier means for providing a feedback signal to the gated oscillator for controlling an on/off state of the gated oscillator.

5. The low-level, high-efficiency, DC-to-DC converter circuit of claim 1 and further including battery back-up means connected between the rectifier means and the pair of output terminals for providing current to the load should the source of DC voltage become non-operational.

6. The low-level, high-efficiency, DC-to-DC converter circuit as in claim 5 wherein the battery back-up means comprises a rechargeable battery, means for applying a recharging current to the battery when the source of DC voltage is operational; and a further electronic switching means for automatically connecting said rechargeable battery across the load in the event the source of DC voltage becomes non-operational.

7. The low level, high efficiency DC-to-DC converter of claim 1 and further including means for sensing the state of the laser source and optical fiber as operational or non-operational.

8. The low level, high efficiency DC-to-DC converter of claim 7 and further including means for producing an optical output signal when the state of the laser source and optical fiber is operational.

9. The low level, high efficiency DC-to-DC converter of claim 8 wherein the means for producing an optical output signal comprises a LED or low level laser connected to the output of an astable multivibrator and means for enabling the astable multivibrator when the solar cell comprising the source of DC voltage is producing a DC voltage above a predetermined threshold value.

* * * * *